March 17, 1953 A. RAPPL 2,631,649
VEHICLE SEAT
Filed Feb. 7, 1948
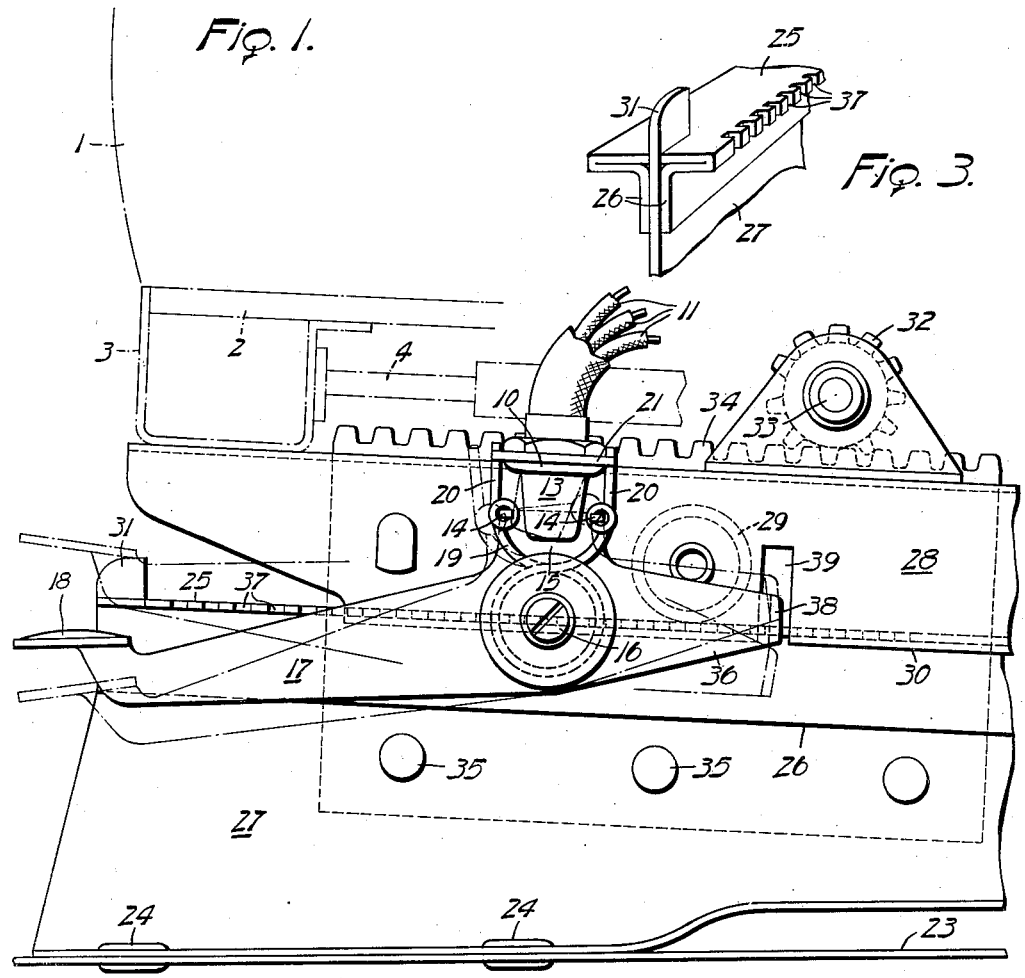
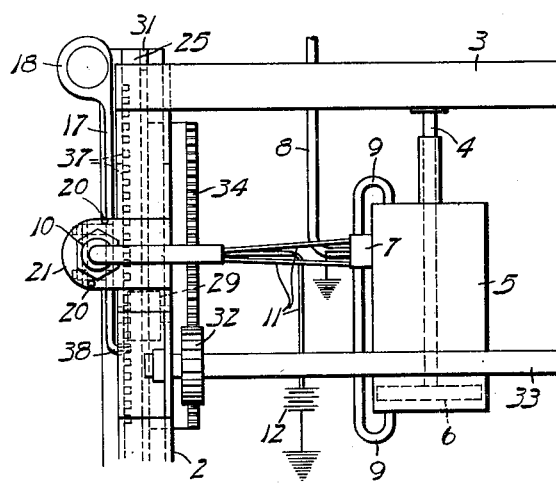
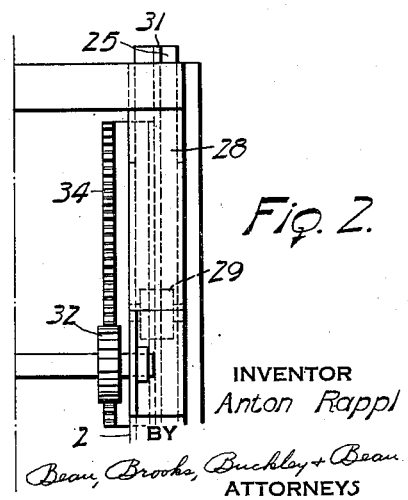
INVENTOR
Anton Rappl
BY Bean, Brooks, Buckley + Bean
ATTORNEYS Patented Mar. 17, 1953

2,631,649

UNITED STATES PATENT OFFICE 2,631,649

VEHICLE SEAT

Anton Rappl, Eggertsville, N. Y., assignor to Trico Products Corporation, Buffalo, N. Y.

Application February 7, 1948, Serial No. 6,879

3 Claims. (Cl. 155—14)

This invention relates to the motor vehicle seat art and especially to an adjustable seat. It has for its aim to provide a practical and durable seat adjustment of simple and economical construction.

Since the seat of an automobile is frequently adjusted with the weight of its occupants, it is desirable that the latch which secures the adjustment be readily controlled. A further object of this invention is to provide latch arrangement which can easily be manipulated and one which will insure reengagement of the locking parts when released.

The foregoing and other objects will manifest themselves as this description progresses, reference being made herein to the attached drawings wherein:

Fig. 1 is a fragmentary side elevation of the improved seat;

Fig. 2 is a top plan view thereof with the cushioned upholstery removed; and

Fig. 3 is a detail perspective view of the latch rail.

Referring more particularly to the drawing, the numeral 1 designates the upholstered cushion of the vehicle seat, 2 its bottom frame, and 3 a transverse brace member to which the forward end of an actuating rod 4 is attached. Herein, this rod constitutes the piston rod of a fluid motor having an anchored fluid chamber 5, a piston 6 and a control valve 7 which latter serves to connect operatively the pressure line 8 from a source of fluid pressure, such as the intake manifold of the vehicle engine, to the branch passages 9 that open into the opposite ends of the chamber.

The control valve selectively opens the branch passages to the suction supply line 8 in order that the atmospheric pressure, entering through the companion branch passage, will move the piston and adjust the seat. This valve actuation may be accomplished by suitable electromagnetic means (not shown) under the control of a two-way switch 10 to which it is connected by wires 11 in circuit with a source of electric energy 12, all in a manner similar to that shown in my earlier application, Serial No. 777,477. The switch has a rockable handle 13 straddled by spaced lugs 14 on an actuating lever arm. As depicted herein, the arm 15 is pivoted at 16 and has an angularly extending operating arm 17 terminating in a button 18. A spring 19 is coiled about the pivot 16 and has its opposite terminals 20 freely bearing upon the opposite sides of the switch supporting bracket 21 as well as upon the remote sides of the lugs 14.

When the operating arm 17 is depressed, the switch arm 15 will move counter-clockwise against the tension of the right hand one of the spring terminals 20, and when the arm 17 is lifted, the arm 15 will be moved clockwise against the tension of the left terminal 20. From either operative position the switch arm 15 will be returned to an intermediate or neutral position.

The seat substructure or base is suitably anchored to the floor 23 or other supporting part of the vehicle, as by fasteners 24, and comprises a pair of spaced parallel rails 25, each having its opposite marginal portions bent upon itself and shaped to form depending flanges 26 straddling and secured to a supporting web 27. Side frame members 28 are joined to one or more transverse frame members 3 and have sliding support on the rails, the sliding action being facilitated by suitable anti-friction means or wheels 29. The sides 28 have flanges 30 depending on the remote opposite sides of the rails to guide the seat thereon. A stop 31 upstands from the web and above the rail to arrest extreme seat movement upon its substructure. A translatory movement of the seat is maintained by a motion equalizer in the form of a pair of pinions 32 fixed to the opposite ends of a shaft 33 and meshing with parallel racks 34, the latter being conveniently secured to the webs 27 by fasteners 35.

For securing the seat in a given adjustment, a latch 36 is provided to engage in a selected one of a series of notches 37. In the illustrated embodiment the latch is carried by the seat, and the notches or recesses are formed in a longitudinal edge of one of the rails as a keeper bar or strip. In order to timely release the seat with respect to motor operation, the latch is made a part of the switch lever 15, 17 to rock therewith. Thus, the switch lever becomes a latch lever and the spring 19 yieldably restores the switch arm as well as the latch arm 36 to their neutral positions. The latch has a deflected tongue 38 at its outer end for entering the selected notch when in a neutral position. The tongue is adapted to lift out of the notch or depress therefrom, depending upon the direction of seat adjustment as determined by the operation of the operating arm 17. The adjacent side 28 has a cut-out 39 to receive the locking tongue 38 and to accommodate its movement. Through the motion equalizing shaft 33 the single latch 36 serves to admirably arrest and hold the seat firm.

The adjustment is readily secured by simply depressing or lifting the arm 17 which automatically unlatches the seat preliminary to energizing the motor. The construction is durable and economical. And while the foregoing description is given in detail it has been done without thought of limiting the disclosure since the inventive teachings thereof are capable of assuming other physical embodiments without departing from the scope of the appended claims and the spirit of the present invention.

What is claimed is:

1. An adjustable seat for motor vehicles, comprising a rail structure having an upright web plate with an upstanding stop projection adjacent one end of its upper longitudinal edge, a rail member having a top track surface with an opening in one end to receive the stop projection, said rail member having depending flanges straddling the upper edge of the web plate for mounting the rail member thereupon, the track surface portion of the rail member extending longitudinally of the web plate and having one side margin overhanging the latter and notched to form teeth, a seat structure slidably supported on the track surface, and latch means carried by the seat structure and selectively engageable with the teeth for securing the seat structure in a given position on the rail structure.

2. An adjustable seat for motor vehicles, comprising a rail structure having an upright web plate and a rail member on the upper edge of the web plate extending lengthwise thereof and having one longitudinal margin of the rail member in the form of a lateral flange overhanging the web plate, said lateral overhanging flange provided with notches opening therethrough, a seat structure slidably adjustable on the rail member, and a latch movably carried by the seat structure for selective engagement in the notches and movable from the selected notch to either side of the flange for freeing the seat structure for adjustment.

3. An adjustable seat for motor vehicles, comprising a rail structure having an upright web plate and a rail member on the upper edge of the web plate extending lengthwise thereof and having one longitudinal margin of the rail member in the form of a lateral flange overhanging the web plate, said lateral overhanging flange provided with notches opening therethrough, a seat structure slidably adjustable on the rail member, said web plate having a projection extending through the rail member forming an upstanding arresting abutment, a latch carried by the seat structure for movement into a selected notch from a position at either side of the flange, and resilient means yieldably holding the latch in its operative position engaged with a notch from which it may be displaced to either side of the flange.

ANTON RAPPL.

REFERENCES CITED

The following references are of record in the file of this patent:

UNITED STATES PATENTS

| Number | Name | Date |
| --- | --- | --- |
| 2,234,442 | Lustig | Mar. 11, 1941 |
| 2,432,895 | Horton | Dec. 16, 1947 |
| 2,500,316 | Kramer | Mar. 14, 1950 |